United States Patent [19]

Crucius et al.

[11] 4,369,480

[45] Jan. 18, 1983

[54] OVERVOLTAGE ARRESTER INCLUDING A COLUMN OF ARRESTER ELEMENTS AND SHIELDING THEREFOR

[75] Inventors: Michael Crucius; Mohamed A. Hassan, both of Berlin, Fed. Rep. of Germany

[73] Assignee: Siemens Aktiengesellschaft, Berlin and Munich, Fed. Rep. of Germany

[21] Appl. No.: 248,198

[22] Filed: Mar. 27, 1981

[30] Foreign Application Priority Data

Mar. 28, 1980 [DE] Fed. Rep. of Germany ....... 3012741

[51] Int. Cl.³ ............................................. H02H 1/04

[52] U.S. Cl. .................................. 361/128; 361/117; 361/130

[58] Field of Search ............... 361/128, 129, 130, 117; 315/35, 36; 337/34; 338/21

[56] References Cited

U.S. PATENT DOCUMENTS

| | | | |
|---|---|---|---|
| 2,946,920 | 7/1960 | Martin | 315/58 |
| 3,019,367 | 1/1962 | Kalb | 361/128 X |
| 3,484,863 | 12/1969 | Kershaw, Jr. | 361/128 |
| 3,649,875 | 3/1972 | Nagai et al. | 361/130 |
| 3,753,045 | 8/1973 | Osmundsen et al. | 361/130 X |

FOREIGN PATENT DOCUMENTS

| | | |
|---|---|---|
| 2037921 | 2/1971 | Fed. Rep. of Germany . |
| 3034292 | 2/1955 | Switzerland . |
| 304299 | 3/1955 | Switzerland . |

*Primary Examiner*—Reinhard J. Eisenzopf
*Attorney, Agent, or Firm*—Kenyon & Kenyon

[57] ABSTRACT

Disclosed is an overvoltage arrester in which the active part comprises a number of shielding elements with arrester elements fastened thereto in the interior thereof. The shielding elements along the inner circumference thereof have a circular depression for electrically and mechanically connecting the arrester elements to the shielding elements. The shielding elements are connected to each other by insulating support members and conducting support members. The arrester elements can be arranged in a star- or cross-shaped structure at the center of which conducting or insulating connecting members may be provided. Arresters according to the invention are particularly suited for use in pressurized gas-insulated metal-encapsulated high-voltage switching installations in conjunction with arrester elements having voltage-dependent resistors of the zinc oxide type. The active part of the arresters according to the invention can be installed outdoors without a housing. In addition to zinc oxide resistors, resistors of other non-linear materials can be used for the arrester elements.

15 Claims, 3 Drawing Figures

OVERVOLTAGE ARRESTER INCLUDING A COLUMN OF ARRESTER ELEMENTS AND SHIELDING THEREFOR

BACKGROUND OF THE INVENTION

The present invention relates to an overvoltage arrester of the type including a column formed by a multiplicity of arrester elements, arranged in a housing, with shielding elements or members surrounding the column.

An overvoltage arrester of the type described above is disclosed in DE-AS No. 20 37 921. The purpose of the shielding members in the '921 DE-AS is to provide a uniform voltage distribution over the series-connected arrester elements. The desired operation of the overvoltage arrester can be ensured in this manner also if the overvoltage arrester has a grounded metal housing of the type used in pressurized gas-insulated metal-encapsulated switching installations.

Series-connected arrester elements, which may in particular include voltage-dependent resistors and spark gaps, arranged in a column, has long been accepted in overvoltage arrester because it makes the desired series connection possible without the need for additional circuit or connecting elements. However, this arrangement can lead to an extraordinary height of the overvoltage arrester where it is intended to use the overvoltage arrester with very high operating voltages, e.g. 500 kv or more. To reduce the overall height, it is known to distribute the arrester elements over several parallel columns and to use a frame or story like construction. (See, for example, Swiss Pat. Nos. 304,299 and 303,429 and U.S. Pat. No. 2,946,920.) However, those arrangements are not suitable for metal encapsulated arresters because the cost for equalizing the voltage distribution becomes excessively high and the reduction in volume is offset in part by the means required for the voltage distribution. Simple shielding elements or members such those used with the single-column arrangement are not generally applicable to the multiple parallel column, frame-like arrangement.

OBJECTS AND SUMMARY OF THE INVENTION

It is an object of the present invention to provide an improved overvoltage arrester for high and very high operating voltages.

It is another object of the present invention to provide such an overvoltage arrester which is equally suitable for installation in metal encapsulations and outdoors.

It is a further object of the present invention to provide an overvoltage arrester for high and very high operating voltages which includes simple means for controlling the voltage distribution. It is also an object to provide such an arrester with a small overall height and which has an increased capacity for energy absorption.

These and other objects are achieved in an overvoltage arrester of the type described above by connecting the shielding elements or members to each other, and by providing shielding members including means for fastening the arrester elements thereto. The shielding members can be connected to each other by support members in accordance with the invention.

According to the invention, a number of shielding members are used as supports for the arrester elements instead of using, as heretofore, a column of arrester elements as supports for the shielding members.

Space utilization can be increased in accordance with one aspect of the invention by arranging series and/or parallel-connected arrester elements within the space surrounded or enclosed by each shielding member. According to another aspect of the invention, a circular depression can be disposed along the inner circumference of the shielding members in which clamping pieces can be anchored to provided a mechanically strong arrangement. Sliding nuts which are screwed into the arrester elements with a threaded bolt can for example be used as clamping pieces.

A parallel circuit of arrester elements in which arrester elements extending in a plurality of planes are connected in parallel can be provided, as well as a series circuit of arrester elements extending in a plane.

According to one embodiment, at least two adjacent shielding members can be connecting together in a conducting manner, and the arrester elements can be arranged in adjacent planes electrically connected in paralled and fastened to the shielding members. Thus, overvoltage arresters with a desired value of the arrester current and the quenching voltage can be produced which at the same time have an increased energy absorption capacity, using uniform parts.

According to a further aspect of the invention, several arrester elements can be accommodated within the space surrounded by a shielding member, particularly in a cross-or star-shaped arrangement; at the center of this arrangement, a connecting member is preferably provided which can be connected to the connecting member of adjacent groups of arrester elements. The connecting members may be conducting or insulating, depending on the path along which the arrester current of the overall arrangement is to flow.

According to another aspect of the invention, shielding members of larger diameter can be provided at both ends of a column formed by smaller shielding members. The larger diameter shielding members improve the field pattern at the ends of the column arrangement and can be used at the same time for fastening the column inside the surrounding housing or for installations without housing, to a grounded base or voltage terminal, for example.

These and other objects, aspects, features and advantages of the invention will be more apparent from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which.

DESCRIPTION OF THE PREFERRED EMBODIMENTS

Figure 1:
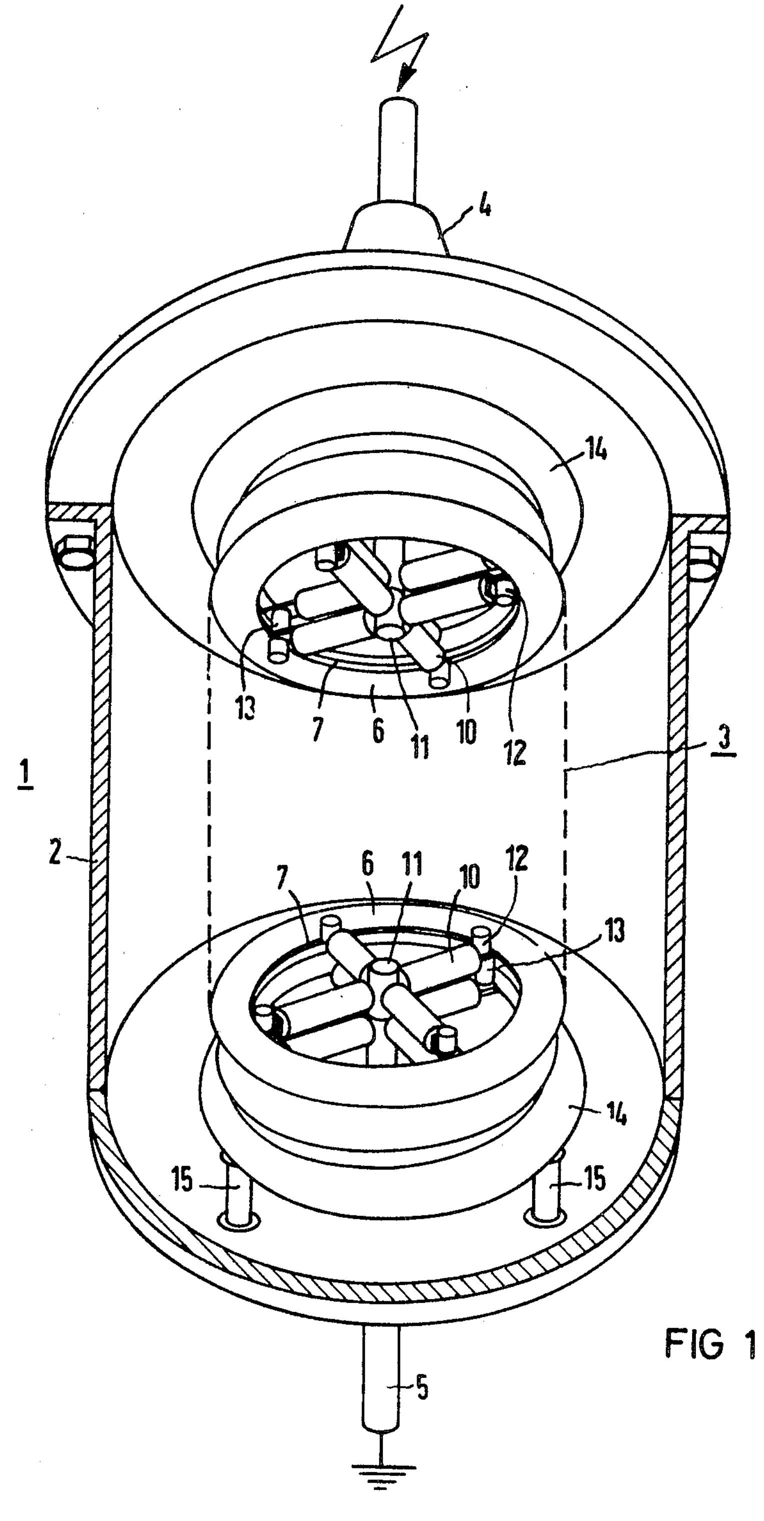
FIG. 1 is a perspective view, partly in cross section. of a metal-encapsulated overvoltage arrester according to the invention.

Referring now to the drawings, FIG. 1 depicts an overvoltage arrester 1 comprising a metal housing 2 which can be sealed off gas-tight and which contains an insulating gas, e.g., $SF_6$. The active part of the arrester, designated generally by 3, is connected by means of a feedthrough 4 to the voltage-carrying parts of the installation to be protected. A ground terminal 5 is provided at the opposite end of the cylindrical housing 2.

The active part 3 of the overvoltage arrester comprises a number of annular shielding members 6 which have a groove like depression 7 along their inner circumference. The depression can be a slot if the shielding members 6 are made of sheet metal as hollow bodies. The depression or slot 7 enables the arrester elements 10 to be fastened to the shielding members 6 at any point of the inner circumference of the shielding member by means of suitable clamping pieces, sliding nuts or similar parts. In the embodiment shown in FIG. 1, four arrester elements 10 are provided in a cross or star-shaped arrangement within the space surrounded by each shielding member 6. Those four arrester elements are connected electrically in parallel to the shielding member 6 and to a common central connecting member 11. Each individual arrester element 10 can be a voltage-dependent resistor, a spark gap, a series circuit of such elements, or an element for controlling the voltage distribution. The elements chosen or combined with each other depends on the currents and voltages which the overvoltage arrester is to control. In order to make an overvoltage arrester for high and very high operating voltages as compact as possible, voltage-dependent resistors of the zinc oxide type are preferably used. Resistors of the silicon carbide type or of other non-linear materials can also be used.

As shown in FIG. 1, an insulating support member 12 is disposed at one side of the connecting point of each arrester element 10 with a shielding member 6, and a conducting support member 13 is disposed on the other side of that connecting point. On those members rest the respective next group of arrester elements 10 and the shielding member 6 associated therewith. A current path can be obtained which alternatingly leads radially from the outside of the arrester to the inside, and radially from the inside again to the outside, over the entire overvoltage arrestor, by alternating conducting and insulating support members 12, 13 from plane to plane, and by alternating conducting connections in a corresponding sequence between adjacent central connecting members 11.

Although FIG. 1 shows four arrester elements per plane, a number of arrester elements smaller or larger than four can be accommodated per plane. At the lower end of the arrester of FIG. 1, a further shielding member 14 having a larger diameter than the shielding members 6 is provided for equalizing the fringe field. An identical larger shielding member 14 is also provided at the upper end of the active part 3 of the arrester. As shown in FIG. 1, the entire active part of the arrester is fastened and centered in the metal housing 2 by the feedthrough to the grounded terminal 5 and by the support insulators 15. A housing of insulating material can be used instead of a metal housing if the overvoltage arrester is intended for outdoor installation.

The housing or the encapsulation may be provided with a burst diaphragm which prevents excessive pressure stress on the housing or the encapsulation in the event of an overload of the active part of the overvoltage arrester. The inner spaces of the shielding members when provided as hollow bodies, can be used as collecting or buffer spaces for the gases generated during an overload if the shielding members are suitably connected to the arrester elements. The gases then do not stress the housing or the encapsulation directly and can be discharged from the interior of the shielding members by means of a burst diaphragm.

Figure 2:
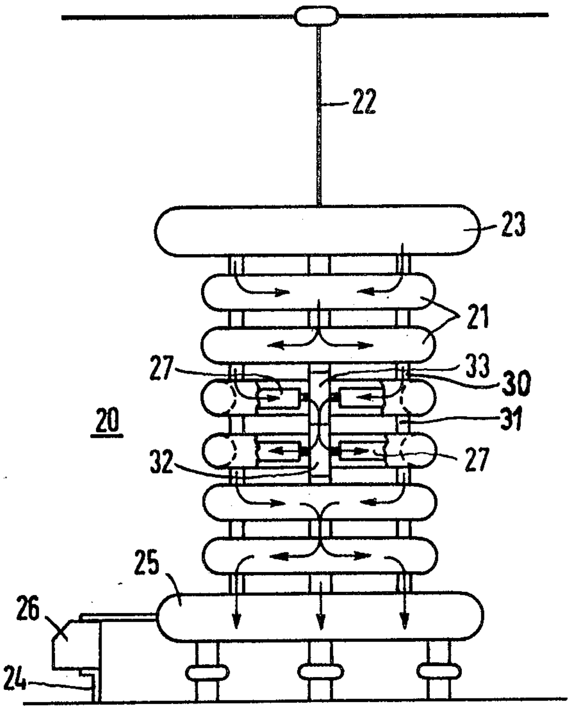
FIGS. 2 and 3 are elevation views of embodiments of overvoltage arresters according to other embodiments of the invention without housings for outdoor installation.

Referring not to FIG. 2 an overvoltage arrester 20, similar to that of FIG. 1, is provided without a housing. A number of ring-shaped shielding members 21 is provided in the central part of the arrester 20 with larger diameter shielding members 23 and 25 disposed adjacent the voltage terminal 22 and the ground terminal 24, respectively. Between the lower terminating shielding member 25 and the ground terminal 24, a monitoring device 26, for example a response counter, can be inserted.

Two of the shielding members 21 in FIG. 2 are shown partly in cross section in order to expose the arrester elements. As shown, each shielding member 21 encloses arrester elements 27 in an arrangement similar to that of the arrester of FIG. 1. As described in connection with FIG. 1, the direction of the current flow from plane to plane can be made to alternate by alternatingly inserting conducting and insulating support members 30 and 31 as well as central conducting and insulating connecting bodies 32 and 33, as indicated by the arrows.

Figure 3:
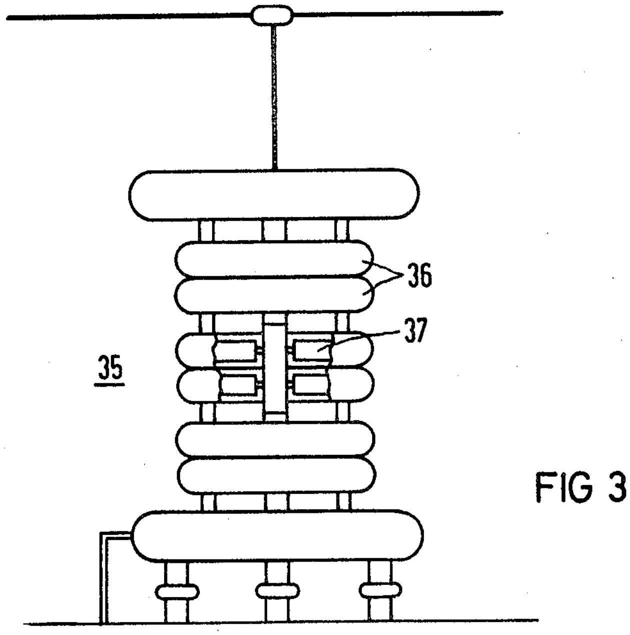

The overvoltage arrester 35 depicted in FIG. 3 differs from the overvoltage arrester 20 of FIG. 2 in that two respective adjacent shielding members 36 are adjacently disposed without a space therebetween and are connected in a conducting manner, or are combined within a single shielding member. In this manner, the arrester elements 37 enclosed by the respective adjacent shielding members can be connected in parallel. With a total of six shielding members 36, three groups of parallel-connected arrester elements can be provided with the individual groups of separated shielding members connected in series as described for the simple series-connected groups of FIGS. 1 and 2. A partial parallel connection provides the advantage of controlling larger arrester currents or energy.

The member of shielding members shown in the drawings was chosen for the purposes of clarity of presentation. The overvoltage arresters can however have a smaller or a larger number of shielding members. The circular outline form of the shielding members, furthermore, is merely illustrative and other outline forms of shielding members, for example, rectangular or square, can be selected. The shielding members however are rounded in the axial direction.

The advantages of the present invention, as well as certain changes and modifications of the disclosed embodiments thereof, will be readily apparent to those skilled in the art. It is the applicants' intention to cover by their claims all those changes and modifications which could be made to the embodiments of the invention herein chosen for the purposes of the disclosure without departing from the spirit and scope of the invention.

What is claimed is:

1. An overvoltage arrester comprising a plurality of shielding elements each having an opening therethrough, the shielding elements being substantially superposed so that the openings are substantially aligned, a plurality of electrically interconnected arrester elements disposed in the substantially aligned openings, means associated with each of at least two adjacent shielding elements for fastening at least one arrester element to each of the two shielding elements and a plurality of support members disposed between adjacent shielding elements at the periphery of the openings in the shielding elements for supporting the shielding elements, the shielding elements providing support for the arrester elements fastened thereto.

2. The overvoltage arrester of claim 1 wherein the shielding elements are annular.

3. The overvoltage arrester of claim 2, wherein a plurality of arrester elements are disposed within the opening in and connected to each of the two shielding elements.

4. The overvoltage arrester of claim 3, wherein the arrester elements within a shielding elements are arranged in a common plane and electrically connected in parallel.

5. The overvoltage arrester of claim 3 wherein at least some of the arrester elements within at least one shielding element are arranged in at least two adjacent planes with the arrester elements of one plane being electrically connected in parallel to those of an adjacent plane.

6. The overvoltage arrester of claim 3 wherein at least two adjacent shielding elements are connected to each other in a conducting manner and the arrester elements within one of the connected shielding elements are connected in parallel with those of the other of the connected shielding elements.

7. The overvoltage arrester of claim 3, wherein the arrester elements within a shielding element are arranged in a cross- or star-shaped manner with one end of each arrester element fastened to the shielding element and a connecting member centrally disposed relative to the shielding elements interconnecting the other ends of the individual arrester elements, the central connecting member being adapted to be connected to another central connecting member of adjacent groups of arrester elements.

8. The overvoltage arrester of claim 7, wherein respective support members and central connecting members associated with adjacent shielding elements are selected to provide different current flow directions in the arrester elements of the adjacent shielding elements.

9. The overvoltage arrester of claim 3 and including means for connecting together arrester elements which are fastened to each shielding element and for connecting arrester elements which are fastened to adjacent shielding elements.

10. The overvoltage arrester of claim 9, wherein one end of each arrester element is fastened to a respective shielding element and said means for connecting comprises a connector centrally disposed relative to the shielding element to which are fastened the other ends of the arrester elements which are fastened to a respective shielding element and the other ends of the arrester elements fastened to an adjacent shielding element.

11. The overvoltage arrester of claim 2, wherein the shielding elements have a circular depression along the inside circumference thereof in which means for clamping an arrester element to a shielding element can be anchored.

12. The overvoltage arrester of claim 2, wherein identical shielding elements are provided in a central region of the overvoltage arrester and shielding elements of larger diameter are provided adjacent ends of the central region.

13. The overvoltage arrester of claim 2 and including means for connecting together arrester elements which are fastened to adjacent shielding elements.

14. The overvoltage arrester of claim 13 wherein one end of each arrester element is fastened to a respective shielding element and said means for connecting comprises a connector centrally disposed relative to the shielding elements to which are fastened the other ends of the arrester elements which are fastened to adjacent shielding elements.

15. The overvoltage arrester of claim 1 wherein the support members cooperate with the means for fastening the arrester element to the shielding element to support the shielding elements.

* * * * *